June 10, 1969  A. G. ANDERSON  3,449,004
PANEL FASTENER
Filed Aug. 16, 1967  Sheet 1 of 2
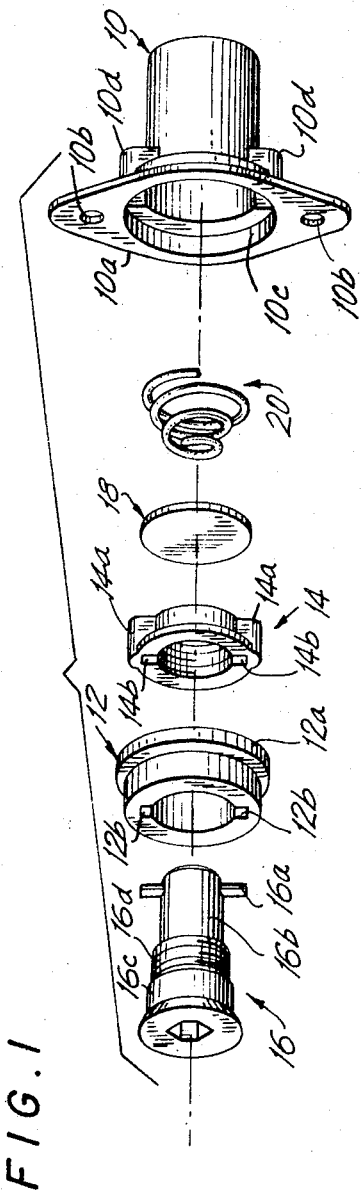
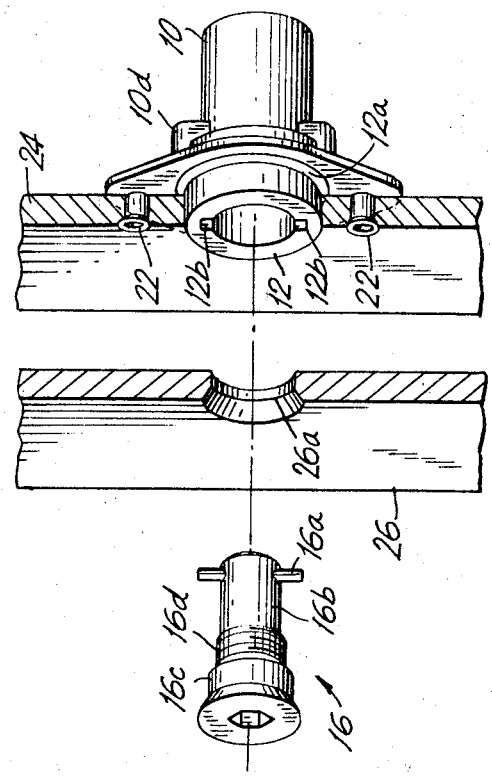
INVENTOR.
ALLAN G. ANDERSON
BY
ATTORNEY

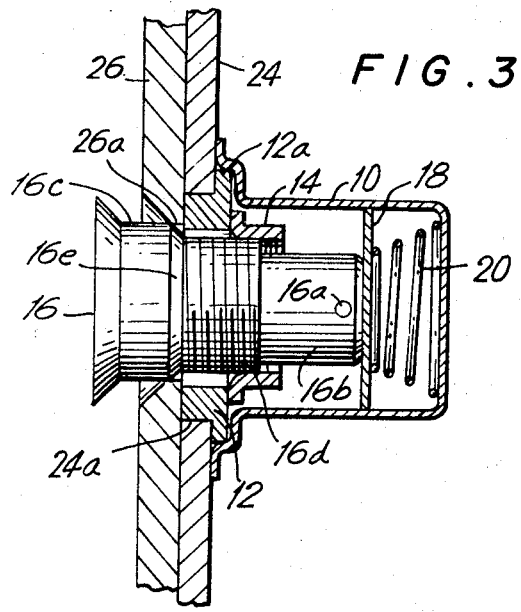
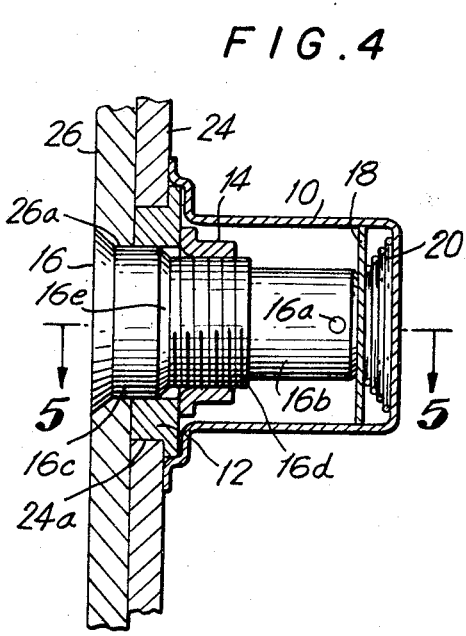
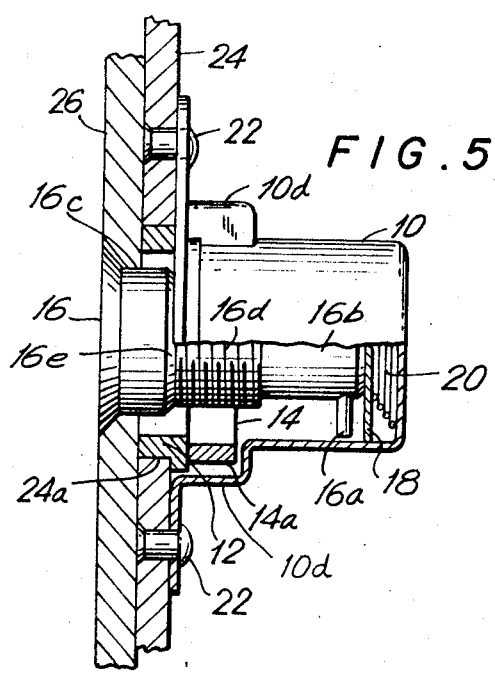

:::
United States Patent Office 3,449,004
Patented June 10, 1969

1

3,449,004
PANEL FASTENER
Allan G. Anderson, Cypress, Calif., assignor to Standard Pressed Steel Co., Jenkintown, Pa., a corporation of Pennsylvania
Filed Aug. 16, 1967, Ser. No. 660,963
Int. Cl. F16b 1/00, 5/00, 7/00, 39/00, 43/00
U.S. Cl. 287—189.36                                    5 Claims

ABSTRACT OF THE DISCLOSURE

A fastener having a floating nut element contained within a housing by a bushing at an open end of the housing. The housing is arranged to be secured to a substructure with the bushing extending into a pre-cut hole in the substructure. A partially threaded bolt enters the housing through the bushing for insertion into the nut. The bushing and nut have axially aligned slots through which a diametral pin at the leading end of the bolt passes. The bolt and nut are arranged for the diametral pin to pass through the slots in the nut before the bolt threads engage the nut threads.

---

The present invention relates, in general, to fastening devices and, in particular, to a high-strength fastener which may be employed to attach a panel, plate or similar part to a substructure. Although one of the more important applications of the present invention is in the assembly of aircraft, it will be readily apparent that its potential use is more widespread.

Aircraft now are being constructed with the outer metal sheet covering, commonly known as the "skin," providing part of the structural support of the craft. Because of this, the fastening devices which are used to attach the skin to the airframe must be strong and reliable.

Generally, fastening devices which are presently available for securing panels to an airframe will not satisfy future needs when larger and faster moving aircraft are built. With an increase in the size and speed of aircraft, there will be a corresponding increase in the load to which fastening devices will be subjected. One of the more critical considerations of future fasteners will be their shear strength capability. In addition, the size and weight of a fastener, already of prime concern at the present time, undoubtedly will be an even more important factor in the future.

Still another problem at present and one which may be more important in the future, is the misalignment of the holes in a panel and a structural member in the airframe to which the panel is to be secured.

It is an object of the present invention to provide a new and improved high-strength panel fastener.

It is another object of the present invention to provide a high-strength panel fastener capable of sustaining very high shear loads.

It is yet another object of the present invention to provide a high-strength panel fastener which is relatively light in weight and small in size.

It is a further object of the present invention to provide a fastener which is reasonable in cost and highly reliable in operation.

Still another object of the present invention is to provide a high-strength panel fastener which is self-aligning.

These objects, as well as others, are achieved according

2 to the present invention by providing a fastener having a housing within which a nut element is contained which is prevented from rotating when a mating bolt is turned into the nut. The nut element is held captive in the housing by means of a bushing which has a bore axially aligned with the tapped bore of the nut. The housing is arranged to be mounted on one surface of a substructure so that the bore of the bushing and the tapped bore in the nut are aligned with an opening in the substructure through which the mating bolt is passed. This bolt is provided with a diametral pin at the end opposite from its head. In order to accommodate this diametral pin, the bore in the bushing and the tapped bore in the nut are provided with diametrically opposed axial slots which extend radially outward and throughout the entire lengths of these two parts. Thus, as the threaded bolt is passed through the bushing and inserted into the nut, the diametral pin first passes through the axial slots to a point beyond the nut before the threads of the bolt engage the threads of the nut. Spring ejection means are provided at a point between the nut and the closed end of the housing for urging the bolt axially out of the bushing and the nut upon disengagement of the threads of the bolt and the nut.

For a better understanding of the present invention, together with other and further objects thereof, reference is made to the following description, taken in connection with the accompanying drawings, and its scope will be pointed out in the appended claims.

Referring to the drawings:

FIGURE 1 is an exploded perspective view of a high-strength panel fastener constructed in accordance with the present invention;

FIGURE 2 is a perspective view, partially broken away, of the fastener in FIGURE 1 after it has been assembled and illustrates how it is employed in securing a panel to a substructure;

FIGURE 3 is a sectional view of a fastener constructed in accordance with the present invention prior to the bolt being seated;

FIGURE 4 is a sectional view, similar to FIGURE 3, but after the bolt has been seated; and FIGURE 5 is a sectional view taken along line 5—5 of FIGURE 4.

Referring to FIGURE 1, a high-strength panel fastener constructed in accordance with the present invention includes a housing 10, a bushing 12, a nut 14, a partially threaded bolt 16, and spring ejection means in the form of a disc 18 and a coil spring 20. The housing 10, generally cylindrical in form, is provided with a flange 10a at its open end. A pair of holes 10b is provided in flange 10a through which a pair of rivets 22 may pass to secure the housing to a substructure 24 in the manner illustrated in FIGURES 2 and 5. The housing 10 is so positioned on substructure 24 that the open end of the housing is aligned with an opening 24a in the substructure.

As is clearly ilustrated in FIGURES 3, 4, and 5, the nut element 14, the disc 18 and the spring 20 are contained within housing 10. Bushing 12 is tightly fitted into housing 10 near the open end of the housing and serves to retain nut element 14 in the housing. In particular, a length of the bushing, designated by reference numeral 12a, and the inside surface 10c at the open end of the housing 10 are so dimensioned that the bushing is inserted into the housing by means of a press fit.

Nut element 14 is provided with two ridges 14a which are diametrically opposed and which fit into correspondingly shaped cavities 10d in housing 10. This arrangement prevents the nut from rotating when bolt 16 is turned into the nut. The nut element 14 is so shaped and dimensioned as to float within the housing.

Both bushing 12 and nut 14 are provided with diametrically opposed axial slots 12b and 14b, respectively, which extend radially outward from the respective bores and which run the entire length of each of these component parts. These slots are provided to accommodate a diametral pin 16a at the leading end 16b of bolt 16. Pin 16a is press fit or otherwise held securely at this point in bolt 16. The pin 16a is secured to bolt 16 at its leading end 16b after the bolt has been passed through a panel 26 which is to be attached to substructure 24. Because the length of pin 16a is greater than the diameter of hole 26a through which the shank of bolt 16 is passed, the bolt remains with panel 26 when the panel is removed. At a result, accidental loss of the bolt is avoided.

The leading end 16b of bolt 16 is unthreaded and has a diameter which permits it to pass freely through nut 14 provided the bolt is oriented with the diametral pin 16a aligned with slots 14b. The length of the unthreaded leading end of the bolt is such as to permit the diametral pin 16a to pass completely through slots 14b to behind the nut before the threaded portion 16d engages the thread of the nut.

Bolt 16 has an unthreaded cylindrical shank 16c beneath its head which is of a greater diameter than the threaded portion 16d. A conical section 16e is provided between the cylindrical shank 16c and the threaded portion 16d. This construction provides a ramp which extends from the thread run-out to the full cylindrical shank. The particular arrangement of the bolt in conjunction with the floating nut 14 permits this panel fastener to be self-aligning. FIGURE 3, which shows the condition of the fastener prior to the bolt being fully inserted into the nut, indicates that the hole 26a in panel 26 is slightly offset to the right from the bore of bushing 12. Because nut element 14 is a separate component from bushing 12 and floats within housing 10, this misalignment between the holes in the panel and the substructure may be accommodated. The nut element 14, movable in a plane perpendicular to the axis of bolt 16 is able to receive the leading thread of the bolt. As the bolt is turned into the nut, the ramp section 16e of the bolt engages the leading edge of bushing 12 and slides downward and to the left. As a result, the opposite side of bolt 16 bears against the opposite surface of the hole 26a in panel 26 and forces panel 26 to shift toward the left to align the holes in panel 26 and substructure 24. The diameter of shank portion 16c of the bolt and the inside diameter of bushing 12 are selected for a sliding fit as the bolt is being seated. This results in increased shear strength of the fastener unit.

The coil spring 20 causes disc 18 to bear against the leading end of bolt 16 to urge the bolt out of housing 10. As a result, after threaded portion 16d is turned out of nut 14 and diametral pin 16a is aligned with slots 14b, bolt 16 is pushed outward by spring 20 to facilitate the removal of panel 26 from substructure 24.

The bolt receiving portion of the panel fastener of the present invention is assembled by dropping coil spring 20, disc 18 and nut element 14 into housing 10 in the order indicated. The nut element is oriented with ridges 14a located in cavities 10d. Next, bushing 12 is press fit into the open end of the housing to retain the coil spring, disc and nut element.

In applying the assembled bolt receiving portion to a substructure, the leading edge of the bushing is passed through a pre-cut hole in the substructure from the blind side to the surface against which the panel will be placed. With flange 10a of the housing flush against the substructure, rivets 22 are inserted through holes 10b and aligned holes in the substructure. The rivets then are upset to secure the housing to the substructure.

As indicated in the drawings, the bushing preferably is dimensioned so that it extends to the opposite surface of the substructure and its leading edge is flush against the inside surface of panel 26. This also results in increase shear strength of the fastener unit.

If desired, the tapped barrel of the nut element may be deformed elliptically to render the fastener self-locking. This feature of the present invention is facilitated by the nut element being a separate component from the bushing.

While there has been described what is at present considered to be the preferred embodiment of this invention, it will be obvious to those skilled in the art that various changes and modifications may be made therein without departing from the invention.

I claim:
1. A high-strength joint comprising:
first and second workpieces positioned adjacent one another and having first and second holes extending through said first and second workpieces, respectively, said second hole aligned with said first hole and having a diameter larger than said first hole;
a nut housing having a closed end, and an open end secured to an outside surface of said second workpiece and aligned with said second hole in said second workpiece, said housing having two cavities in the surface thereof adapted to engage ridges on a nut element contained in said housing to prevent rotation of said nut element when a threaded mating bolt is turned into said nut element;
a bushing press fitted into said housing near said open end thereof and having a leading cylindrical section extending into said second hole in said second workpiece to an inside surface of said second workpiece, said leading cylindrical section of said bushing having an outside diameter approximately equal to said diameter of said second hole in said second workpiece, said bushing also having a bore with diametrically opposed axial slots extending radially outward and from one face of said bushing to the other;
a nut element contained within said housing between said bushing and said closed end of said housing, said nut element having two ridges extending into said two cavities in said housing surface, said nut element further having a threaded bore axially aligned with said bushing bore and a pair of diametrically opposed axial slots extending radially outward and from one face of said nut element to the other, said axial slots in said nut element axially aligned with said axial slots in said bushing;
a partially threaded bolt turned into said nut element and having a diametral pin which passes through said axial slots in said bushing and said nut element to a point between said nut element and said closed end of said housing before the threads of said bolt engage the threads of said nut element;
and spring ejecting means including a coil spring and a disk positioned between said nut element and said closed end of said housing for urging said bolt axially out of said bushing and said nut element.

2. A high-strength joint according to claim 1 wherein the diameters of said first hole in said first workpiece and said bore of said bushing are approximately equal.

3. A high-strength joint according to claim 2 wherein said bolt has an unthreaded cylindrical shank portion beneath its head having a diameter approximately equal to said diameter of said bore of said bushing.

4. A high-strength joint according to claim 3 wherein said bolt has a conical section extending between said unthreaded cylindrical shank portion and said threaded portion.

5. A high-strength joint according to claim 4 wherein said diametral pin is located in an unthreaded section at the point end of said bolt at a distance from said threaded portion which is greater than the axial length of said nut element.

References Cited

UNITED STATES PATENTS

| | | | |
|---|---|---|---|
| 1,733,650 | 10/1929 | Cummings | 24—221.2 |
| 2,881,499 | 4/1959 | Summers et al. | 24—221.2 |
| 2,907,418 | 10/1959 | Hudson et al. | 151—41.76 |
| 2,972,367 | 2/1961 | Wootton | 151—69 |
| 3,130,765 | 4/1964 | Neuschotz | 151—41.7 |
| 3,176,747 | 4/1965 | Nenzell | 151—41.7 |
| 3,295,578 | 1/1967 | Maloof | 151—69 |

FOREIGN PATENTS 1,135,944  12/1956  France.

MARION PARSONS, JR., *Primary Examiner.*

U.S. Cl. X.R.

151—41.76, 69